United States Patent
Pisczak et al.

(10) Patent No.: US 11,830,516 B2
(45) Date of Patent: Nov. 28, 2023

(54) VERBAL LANGUAGE ANALYSIS

(71) Applicant: VRBL LLC, Chagrin Falls, OH (US)

(72) Inventors: Spencer Neil Pisczak, Chagrin Falls, OH (US); Chandler Emerson Pisczak, Chagrin Falls, OH (US); James Buery Stevenson, Chagrin Falls, OH (US)

(73) Assignee: VRBL LLC, Chagrin Falls, OH (US)

( * ) Notice: Subject to any disclaimer, the term of this patent is extended or adjusted under 35 U.S.C. 154(b) by 56 days.

(21) Appl. No.: 17/191,445

(22) Filed: Mar. 3, 2021

(65) Prior Publication Data

US 2021/0280207 A1    Sep. 9, 2021

Related U.S. Application Data

(60) Provisional application No. 62/984,655, filed on Mar. 3, 2020.

(51) Int. Cl.

| | |
|---|---|
| *G10L 15/08* | (2006.01) |
| *G10L 25/06* | (2013.01) |
| *G06N 20/00* | (2019.01) |
| *G10L 15/16* | (2006.01) |
| *G06F 3/16* | (2006.01) |
| *G06Q 30/0203* | (2023.01) |
| *G06Q 30/0201* | (2023.01) |

(52) U.S. Cl.
CPC .............. *G10L 25/06* (2013.01); *G06F 3/167* (2013.01); *G06N 20/00* (2019.01); *G10L 15/16* (2013.01); *G06Q 30/0201* (2013.01); *G06Q 30/0203* (2013.01)

(58) Field of Classification Search
None
See application file for complete search history.

(56) References Cited

U.S. PATENT DOCUMENTS

| | | | |
|---|---|---|---|
| 7,606,701 B2 | 10/2009 | Degani et al. | |
| 9,336,268 B1 | 5/2016 | Moudy et al. | |
| 9,521,258 B2 | 12/2016 | Ripa et al. | |
| 9,679,495 B2 | 6/2017 | Cohen | |

(Continued)

OTHER PUBLICATIONS

More Than One Answer. Is the 55-38-7 Rule True or Myth, retrieved on Mar. 3, 2021 from: https://www.morethan1answer.com/the-55-38-7-rule-and-the-myth/#:~:text=55-38-7%20rule%20true%20or%20myth%3F%20The%2055%2038,and%20have%20become%20known%20as%20the%2055%25-38%25-7%25%20Rule.

(Continued)

*Primary Examiner* — Nafiz E Hoque
(74) *Attorney, Agent, or Firm* — James J. Pingor

(57) ABSTRACT

Verbal language analysis is provided to users. The user enrolls or subscribes for verbal language analysis or analytics. The user carries out or conducts a conversation with a third party. An intelligence device associated with the user records the conversation. The intelligence device performs verbal language analysis on the conversation. The verbal language analysis generates individual metrics for verbal factors of energy, word count, inflection, tone (e.g. pitch and sentiment), rate, and/or the like. A verbal intelligence index is determined from the individual metrics using aggregation, averaging, weighted averaging, and/or the like. An interface component generates views to display to the user for review of the conversation to facilitate better verbal performance during current and in future conversations.

20 Claims, 13 Drawing Sheets

(56) References Cited

U.S. PATENT DOCUMENTS

| | | | |
|---|---|---|---|
| 9,992,336 | B2 | 6/2018 | Scott et al. |
| 10,069,971 | B1* | 9/2018 | Shaw .................. H04M 3/5133 |
| 10,104,233 | B2 | 10/2018 | Conway et al. |
| 10,110,743 | B2 | 10/2018 | Raanani et al. |
| 10,250,741 | B2 | 4/2019 | Feast et al. |
| 10,276,188 | B2* | 4/2019 | Feast ....................... G06F 17/00 |
| 10,311,895 | B2 | 6/2019 | Akkiraju et al. |
| 10,438,611 | B2 | 10/2019 | Feast et al. |
| 10,515,156 | B2 | 12/2019 | Wooters |
| 10,582,056 | B2 | 3/2020 | Dwyer et al. |
| 10,593,350 | B2 | 3/2020 | Liu et al. |
| 10,601,992 | B2 | 3/2020 | Dwyer et al. |
| 10,614,832 | B2 | 4/2020 | Spinelli et al. |
| 10,645,224 | B2 | 5/2020 | Dwyer et al. |
| 10,685,655 | B2 | 6/2020 | Ginsberg et al. |
| 10,706,873 | B2* | 7/2020 | Tsiartas ............... G10L 15/1822 |
| 10,755,051 | B2 | 8/2020 | Piernot et al. |
| 10,757,257 | B1 | 8/2020 | Horne et al. |
| 10,839,335 | B2* | 11/2020 | Weisman ................ G06N 20/00 |
| 11,115,531 | B1* | 9/2021 | Shi .......................... G06N 20/00 |
| 2010/0332287 | A1 | 12/2010 | Gates ....................... G06Q 30/02 379/265.09 |
| 2012/0189129 | A1 | 7/2012 | Gabara |
| 2013/0177148 | A1* | 7/2013 | Lee ........................ G06Q 30/02 379/265.06 |
| 2014/0140497 | A1* | 5/2014 | Ripa .................... H04M 3/5175 379/265.06 |
| 2015/0003595 | A1 | 1/2015 | Yaghi et al. |
| 2015/0201077 | A1* | 7/2015 | Konig ................ G06Q 30/0281 379/265.07 |
| 2015/0348570 | A1* | 12/2015 | Feast ....................... G10L 25/48 704/270 |
| 2017/0013131 | A1* | 1/2017 | Craib .................. G06Q 30/016 |
| 2017/0078479 | A1* | 3/2017 | Feast ....................... G10L 25/03 |
| 2017/0301258 | A1 | 10/2017 | Ram et al. |
| 2018/0005152 | A1* | 1/2018 | Carter .................... G06F 17/18 |
| 2018/0261219 | A1 | 9/2018 | Brooks |
| 2019/0005421 | A1 | 1/2019 | Hammel et al. |
| 2019/0102078 | A1 | 4/2019 | Bhatt et al. |
| 2019/0121853 | A1 | 4/2019 | Cai et al. |
| 2019/0272466 | A1 | 9/2019 | Margolin et al. |
| 2019/0279110 | A1 | 9/2019 | Brunn et al. |
| 2019/0279619 | A1 | 9/2019 | Krasadakis |
| 2019/0297035 | A1 | 9/2019 | Fox et al. |
| 2020/0358898 | A1 | 11/2020 | Singer et al. |

OTHER PUBLICATIONS kaaj.com. "Silent Messages—A Wealth of Information About Nonverbal Communication (Body Language)", copyright 1995-2016 by Albert Mehrabian, retrieved on Mar. 3, 2021 from: http://www.kaaj.com/psych/smorder.html.

Speech Tools. "Realtime & remove voice analysis with Voice Analysis," retrieved on Mar. 3, 2021 from: https://speechtools.co/voice-analyst.

Eva Kazimirova. "Pitch-Tracking, or How to Estimate the Fundamental Frequency in Speech—on the Examples of Praat, YAAPT, and YIN Algorithms," Neurodata Lab, Aug. 2, 2018, retrieved on Mar. 3, 3021 from: https://medium.com/@neurodatalab/pitch-tracking-or-how-to-estimate-the-fundamental-frequency-in-speech-on-the-examples-of-praat-fe0ca50f61fd.

Paul Boersma et al. "Praat: doing phonetics by computer," retrieved on Mar. 3, 2021 from: https://www.fon.hum.uva.nl/praat/.

Microsoft Ignite. "What is the Text Analytics API?", Azure Cognitive Services, retrieved on Mar. 3, 2021 from: https://docs.microsoft.com/en-us/azure/cognitive-services/Text-Analytics/overview.

* cited by examiner

```xml
<CALL>
    <Caller>
        <Sentences>
            <Sentence>
                <TrustArtifacts>
                    <TrustArtifact></TrustArtifact>
                </TrustArtirfacts>
                <SpeechSegments>
                    <SpeechSegment></SpeechSegment>
                </SpeechSegments>
            </Sentence>
        </Sentences>
        <Qualification>
            <Questionnaires>
                <Questionnaire>
                    <Questions>
                        <Question></Question>
                    </Questions>
                <Questionnaire>
            </Questionnaires>
        </Qualification>
        <Demographics></Demographics>
    </Caller>
    <Recipient>
        <Sentences>
            <Sentence>
                <SpeechSegments>
                    <SpeechSegment></SpeechSegment>
                </SpeechSegments>
            </Sentence>
        </Sentences>
        <Qualification>
            <Questionnaires>
                <Questionnaire>
                    <Questions>
                        <Question></Question>
                    </Questions>
                <Questionnaire>
            </Questionnaires>
        </Qualification>
        <Demographics></Demographics>
    </Recipient>
</CALL>
```

The Call Message Structure

FIG. 3

```xml
<CALL>
   <CallID>X</CALLID>
   <CallType>Y</CallType>
   <CallPurpose>Z</CallPurpose>
   <CallComments>BLOB</CallComments>
   <CallStartTime>YYMMDD:HHMMSS</CallStartTime>
   <CallEndTime> YYMMDD:HHMMSS</CallEndTime>
   <Caller>
      ...
   </Caller>
    <Recipient>
      ...
   </Recipient>
</CALL>
```

FIG. 4

```xml
<Caller>
    <CallerID>X</CallerID>
    <CallText>BLOB</CallText>
    <CallAudio>BLOB</CallAudio>
    <PitchTrack>BLOB</PitchTrack>
    <SpeechRate>X</SpeechRate>
    <Loudness>Y</Loudness>
    <Sentences>
        <Sentence>
            <SentenceID>1</SentenceID>
            <SentenceText>Hello Bob</SentenceText>
            <Sentiment>X</Sentiment>
            <TrustArtifacts>
                <TrustArtifact>A</TrustArtifact>
                <TrustArtifact>B</TrustArtifact>
            </TrustArtifacts>
            <SpeechSegments>
                <SpeechSegment>
                    <SegmentID>1</SegmentID>
                    <SegmentText>Hello</SegmentText>
                    <PitchSegment>BLOB</PitchSegment>
                    <PitchType>Mild</PitchType>
                </SpeechSegment>
                <SpeechSegment>
                    <SegmentID>2</SegmentID>
                    <SegmentText>Bob</SegmentText>
                    <PitchSegment>BLOB</PitchSegment>
                    <PitchType>Normal</PitchType>
                </SpeechSegment>
            </SpeechSegments>
        </Sentence>
    </Sentences>
    <Qualification>
        <CallRating>X</CallRating>
        <Questionnaires>
            <Questionnaire>
                <QuestionnaireID>1</QuestionnaireID>
                <QuestionnaireRating>X</QuestionnaireRating>
                <Questions>
                    <Question>
                        <QuestionID>1</QuestionID>
                        <QuestionKey>X</QuestionKey>
                        <QuestionValue>Y</QuestionValue>
                    </Question>
                </Questions>
            <Questionnaire>
        </Questionnaires>
    </Qualification>
    <Demographics>
        <PlaceOfResidence>A</PlaceOfResidence>
        <Age>B</Age>
        <Sex>C</Sex>
        <Race>D</Race>
        <Income>E</Income>
        <Education>F</Education>
    </Demographics>
</Caller>
```

*The Caller Tag Structure*

FIG. 5

```xml
<Recipient>
    <RecipientID>X</Recipient>
    <CallText>BLOB</CallText>
    <CallAudio>BLOB</CallAudio>
    <PitchTrack>BLOB</PitchTrack>
    <SpeechRate>X</SpeechRate>
    <Loudness>Y</Loudness>
    <Sentences>
        <Sentence>
            <SentenceID>1</SentenceID>
            <SentenceText>Hello Bob</SentenceText>
            <Sentiment>X</Sentiment>
            <SpeechSegments>
                <SpeechSegment>
                    <SegmentID>1</SegmentID>
                    <SegmentText>Hello</SegmentText>
                    <PitchSegment>BLOB</PitchSegment>
                    <PitchType>Mild</PitchType>
                </SpeechSegment>
                <SpeechSegment>
                    <SegmentID>2</SegmentID>
                    <SegmentText>Bob</SegmentText>
                    <PitchSegment>BLOB</PitchSegment>
                    <PitchType>Normal</PitchType>
                </SpeechSegment>
            </SpeechSegments>
        </Sentence>
    </Sentences>
    <Qualification>
        <CallRating>X</CallRating>
        <Questionnaires>
            <Questionnaire>
                <QuestionnaireID>1</QuestionnaireID>
                <QuestionnaireRating>X</QuestionnaireRating>
                <Questions>
                    <Question>
                        <QuestionID>1</QuestionID>
                        <QuestionKey>X</QuestionKey>
                        <QuestionValue>Y</QuestionValue>
                    </Question>
                </Questions>
            <Questionnaire>
        </Questionnaires>
    </Qualification>
    <Demographics>
        <PlaceOfResidence>A</PlaceOfResidence>
        <Age>B</Age>
        <Sex>C</Sex>
        <Race>D</Race>
        <Income>E</Income>
        <Education>F</Education>
    </Demographics>
</Recipient>
```

*The Recipient Tag Structure*

VERBAL LANGUAGE ANALYSIS

CROSS REFERENCE TO RELATED APPLICATIONS

This application claims the benefit of U.S. Provisional Patent Application Ser. No. 62/984,655, entitled "VERBAL LANGUAGE ANALYSIS" filed on Mar. 3, 2020. The entirety of the above-noted application is incorporated by reference herein.

BACKGROUND

Currently, verbal conversation analytics are limited in their effectiveness because they do not incorporate Verbal Intelligence (VI) into analytics being produced. The lacking negatively impacts the success of Call Centers and Customer Service Representatives throughout the world, as well as the management effectiveness in many different types of organizations. A low level of VI negatively affects all interpersonal relationships.

The effectiveness of telephonic business communication is limited by certain neurological responses that potentially limit the amount of trust the communicating individuals have with one another. While the issues and solutions may be articulated during a call, the intended outcome may not materialize due to certain regions of the brain "freezing up" or a sub-optimal presentation of the issues/solutions during a conversation (e.g. stuttering, stammering, repetition, long pauses, "um's," "ah's" and/or the like. The result is reduced sales, reduced customer service, increased training, increased turnover and/or hiring costs.

Current solutions are only directed towards the "tracking" of calls/conversation or improving the "mechanics" of the call/conversation. The current call analytic solutions measure things such as: Length of call, Talking vs. listening time, and Questions vs. answers time.

The "mechanical" solutions focus on making the customer service representative (CSR) or sales processes more economical and efficient with tools such as: Call forwarding and cueing, Call transcripts, Virtual and remote call answering, and Bots. However, none of these mechanical solutions address increasing the personal effectiveness of a user/conversant.

Verbal Intelligence has been studied by various entities. Neuroscientists around the world have been studying the role the brain plays in the course of a conversation. Conversations impact the neurochemistry of the brain. There are factors that result in "good" conversations and "bad" conversations. However, the conversationalist can be completely unaware of many of the factors. In good conversations, people know where they stand with others—they feel safe. Research indicates that trust is considered the number one trait of feeling safe and a good conversation. In terms of importance, people allocate 7% to words, 38% to tone of voice, and 55% to nonverbal behaviors of in person conversations.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

Verbal language analysis is provided to users. The user enrolls or subscribes for verbal language analysis or analytics. The user carries out or conducts a conversation with a third party. An intelligence device associated with the user records the conversation. The intelligence device performs verbal language analysis on the conversation. The verbal language analysis generates individual metrics for verbal factors of energy, word count, inflection, tone (e.g. pitch and sentiment), rate, and/or the like. A verbal intelligence index is determined from the individual metrics using aggregation, averaging, weighted averaging, and/or the like. An interface component generates views to display to the user for review of the conversation to facilitate better verbal performance in future conversations.

In aspects, the subject innovation provides substantial benefits in terms of verbal language analysis. One advantage resides in a providing real-time or near real time metrics and views for a user to increase effectiveness in conversations. Another advantage resides in an objective metric to determine effectiveness of conversations.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

FIG. 3 illustrates an example call message structure.

FIG. 4 illustrates a call tag structure part of the call message structure.

FIG. 5 illustrates a caller tag structure part of the call message structure.

FIG. 6 illustrates a recipient tag structure part of the call message structure.

DETAILED DESCRIPTION

Verbal language analysis is provided to users. The user enrolls or subscribes for verbal language analysis or analytics. The user carries out or conducts a conversation with a third party. An intelligence device associated with the user records the conversation. The intelligence device performs verbal language analysis on the conversation. The verbal language analysis generates individual metrics for verbal factors of energy (volume), word count, inflection, tone (e.g. pitch and sentiment), rate, and/or the like. The verbal language analysis may be performed in real time or near real time. A verbal intelligence index is determined from the individual metrics using aggregation, averaging, weighted averaging, and/or the like. An interface component generates views to display to the user for review of the conversation to facilitate better verbal performance during the current and in future conversations.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
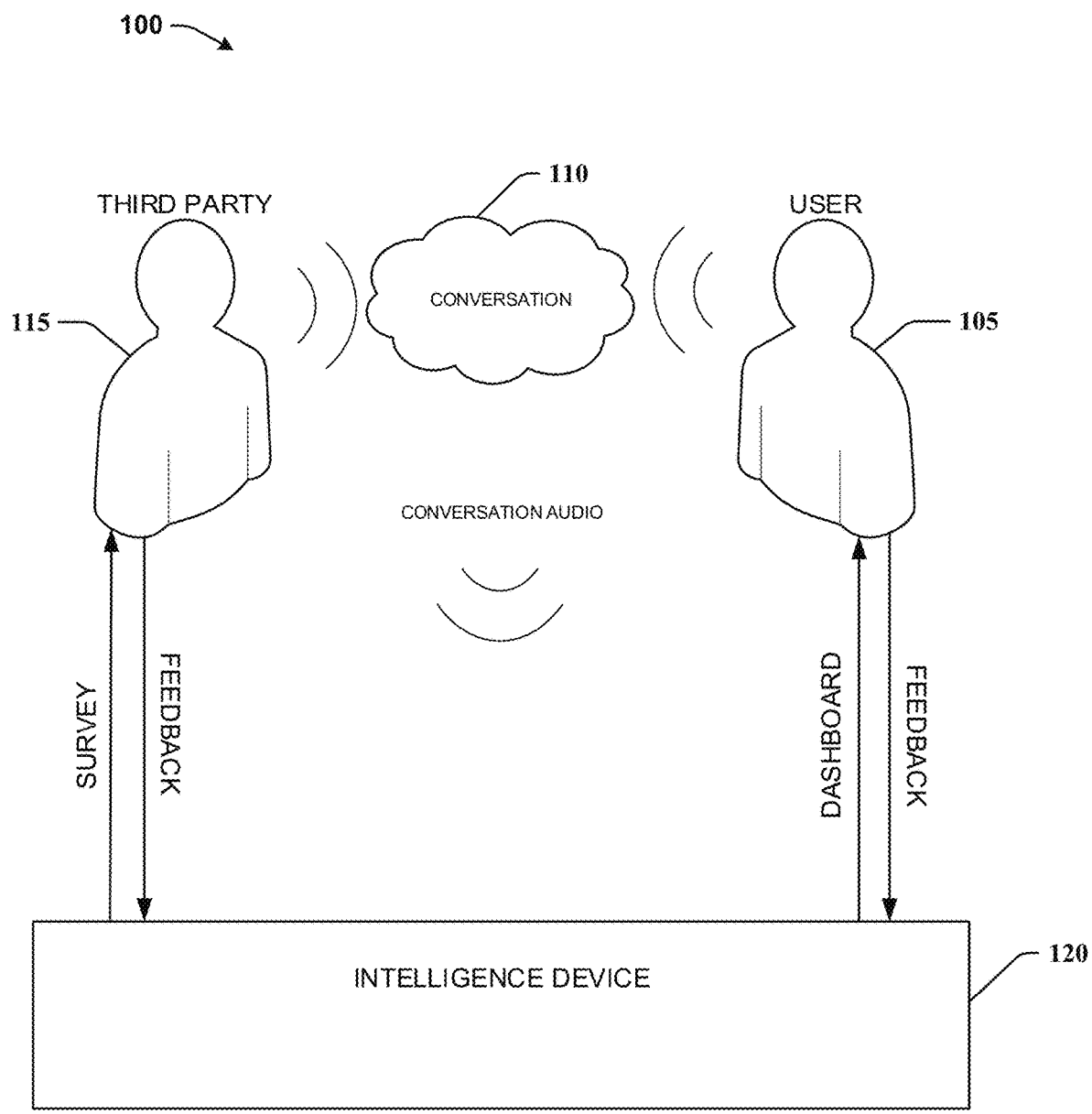
FIG. 1 illustrates a system diagram for verbal language analysis.

FIG. 1 illustrates a system 100 for intelligent verbal analytics. The system 100 includes a user 105 enrolled or registered for verbal language analysis. The user 105 enrolls for the service to monitor one or more conversations 110 with one or more third parties 115. It is appreciated that third party and recipient are synonymous for purposes of this application and are used interchangeably herein. The conversation 110 may be conducted in person, digitally, electronically, telephonically, voice over internet protocol (VOIP), and/or the like. In some embodiments, the conversation 110 can be a speech, presentation, pitch, and/or the like directed at multiple third parties 115.

The system 100 includes an intelligence device 120. The intelligence device 120 is associated with the user 105. The intelligence device 120 can be a wearable device, mobile device, microphone, AI device, internet of things (IOT) device, and/or the like. For example, the intelligence device 120 is a mobile phone that includes a microphone or other recording apparatus. In another example, the intelligence device 120 is a wearable IOT device such as a ring, a necklace, glasses, and/or the like that includes a microphone or other recording apparatus.

In some embodiments, the intelligence device 120 can be available as a mobile application (app), as an enterprise solution, a wearable, and/or the like. As a mobile application, the intelligence device 120 can be available in a mobile application formats and digital application stores. The intelligence device 120 can utilize an application programming interface (API) so it can integrate into other solutions to seamlessly share data and/or the like. In some embodiments, the intelligence device 120 can use or subscribe to a web service or similar cloud solution to store and retrieve data.

The intelligence device 120 can include a microphone and/or other recording apparatus. The intelligence device 120 can record (or receive an audio stream for real time processing) the conversation 110 between the user 105 and the third party 115. The intelligence device 120 can store the recording of the conversation in a local storage apparatus, remote or cloud solution, and/or the like. In some embodiments, the intelligence device 120 can be an integration of other devices. In other embodiments, the intelligence device 120 can integrate with a remote recording apparatus that can be physically or wirelessly connected to the intelligence device 120. For example, the remote apparatus can be a microphone integrated into a ring worn by the user 105 that is wirelessly connected to the user's mobile phone via Bluetooth or WiFi connections.

The intelligence device 120 analyzes the conversation 110 to determine or calculate a verbal intelligence (VI) index. In some embodiment, the conversation 110 is analyzed according to VI factors such as Energy, Words, Inflection, Tone (e.g. pitch and sentiment), Rate, and/or the like of words spoken. Pitch measures the pitch of the user's 105 voice. Energy measures the volume of the user's 105 voice. Words measures the number of words spoken, e.g. in whole conversation 110, in sentences, between third party responses, and/or the like. Inflection can measure the modulation of the voice, Tone can measure intonation or the user's general character or attitude towards the words spoken. In some embodiments, Tone can measure pitch of the voice and the sentiment behind the words spoken. In some embodiments, tone is the color of speech and inflection is defined as the color of speech text. Rate measures the speed the words spoken, e.g. in sentences, whole conversation, start of conversation versus end of conversation, answers to questions, initial presentation, and/or the like.

In some embodiments, the intelligence device 120 captures rate consistency and/or volume consistency (e.g. speeding up vs. slowing down, increasing vs. decreasing volume). In other embodiments, the intelligence device 120 captures written, typed, or text communications to be analyzed individually and/or in conjunction with spoken conversations. In other embodiments, the intelligence device 120 captures and analyzes braille, sign language, and/or the like.

The intelligence device 120 can analyze and rate or score some or each VI data factor. The intelligence device 120 can generate an overall VI index of the user by combining, aggregating, averaging, weighted average, mean, or each individual scoring of the data factors, e.g. energy, words, inflection, tone, rate, and/or the like.

The intelligence device 120 can process the conversation 110 using an autocorrelation algorithm to determine tone or intonations in the conversation 110 to facilitate determining the VI index. The autocorrelation algorithm can be tuned according to machine learned settings to capture the intonations in the conversation 110. In some embodiments, the autocorrelation algorithm is based on at least one of or a combination of Yin, Yaapt, Praat, and/or the like. The tuned settings can affect Time Step, Pitch Floor (Hz), Very Accurate (Boolean), Pitch Ceiling (Hz), Silence Threshold, Voicing Threshold, Octave cost, Octave Jump-cost, Voiced/unvoiced cost, and/or the like.

In some embodiments, the intelligence device 120 factors demographic information of the third party 115 into the VI index. For example, a third party in Kansas City, Kans. provides feedback of their call as unsuccessful. The speech rate of the user was too fast, the voice was too loud, and the pitch rate is aggressive. The sentiment of the call would be negative. Whereas, a third party in New York City, N.Y. provides feedback of their call with identical values as a successful call. The intelligence device 120 can automatically factor the demographic information into the VI index.

In some embodiments, the intelligence device 120 can construct and utilize a predictive model to determine the VI index. The predictive model can be based on determined correlation data to correlate data factors in previous conversations to feedback received about the previous conversations. The previous conversations can be of the user, the third party, both, neither, and/or the like. The predictive model can be built using the correlations such that current and future conversations need not utilize feedback for determining the VI index or other analytics.

The intelligence device 120 can acquire the feedback of the previous conversations by sending a survey or questionnaire to the third party 115 and/or the user 105. The survey can include qualifying questions about the conversation such as how the conversation was presented, positive/negative sentiment, and/or the like. The intelligence device 120 can receive the feedback as answers to the survey of the previous conversation. The survey can be sent to a third party's device.

The intelligence device 120 builds the prediction model by determining correlations between the feedback and the data factors. The intelligence device 120 determines the correlation data based on the determined correlations. In some embodiments, the intelligence device 120 determines the correlation data by applying a machine learning structure to the feedback and the data factors to construct the correlation data into the prediction model. The prediction model can receive the conversation 110 and use the prediction model on the conversation 110 to determine the VI index. In some embodiments, the machine learning can evolve the prediction model over time as more conversations are conducted and analyzed to refine the prediction model for improved results of the VI index.

The intelligence device 120 can generate intelligent dashboards for the user based on the analysis output. In some embodiments, the dashboards can be interactive or static. In other embodiments, the dashboards are customized and/or personalized for the user. The dashboards display the analysis output to the user, recommendations for improvement/increase effectiveness, playback of the recording of the conversation 110, interactive or annotated playback of the recording of the conversation 110, a transcript of the conversation 110, and/or the like. The user 105 can review the dashboards on a display of the intelligence device 120, a separate computing device, and/or the like. In some embodiments, the dashboards can be emailed, texted, printed, push notification, and/or the like to the user 105.

Figure 2:
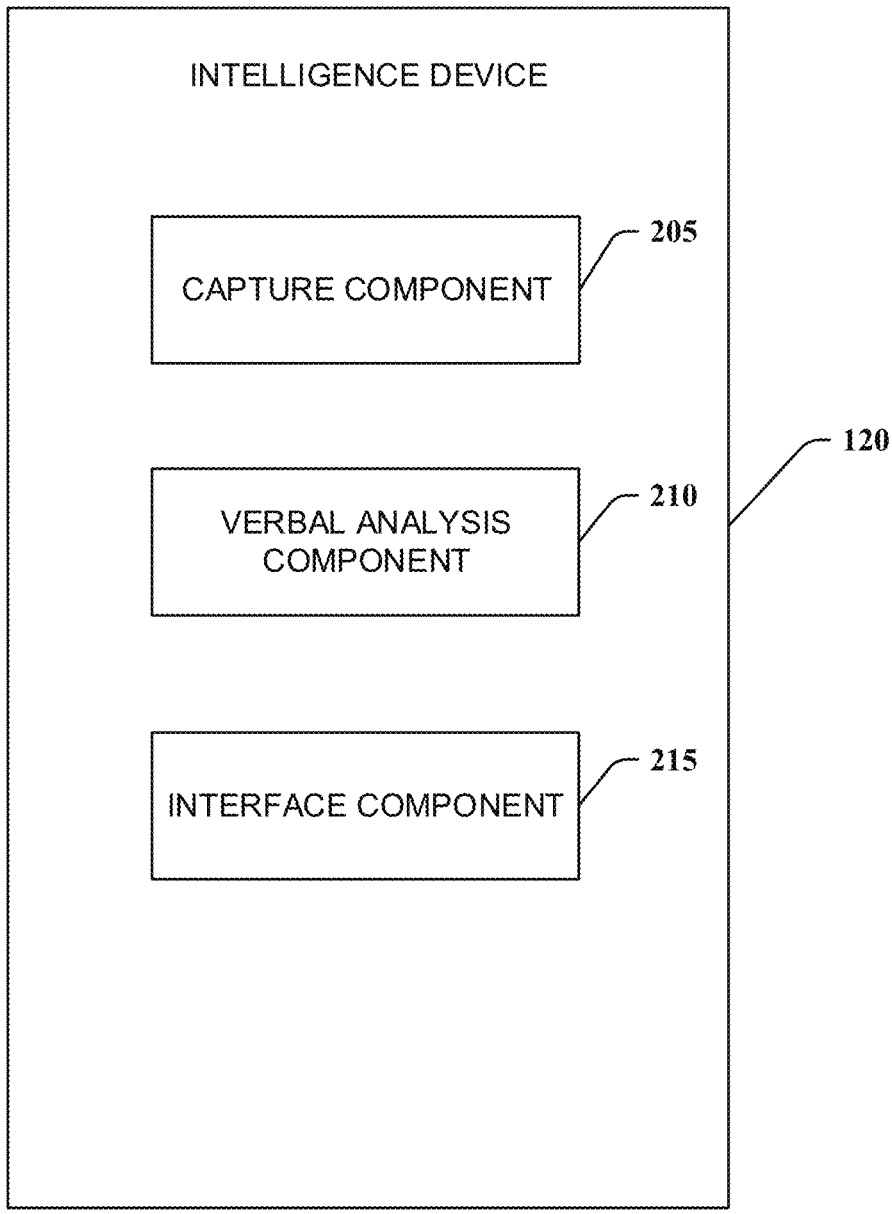
FIG. 2 illustrates an example component diagram of the intelligence device 120.

FIG. 2 illustrates an example component diagram of the intelligence device 120. The intelligence device 120 includes a capture component 205. The capture component 205 can be a microphone and/or other recording apparatus. The capture component 205 can record the conversation 110 between the user 105 and the third party 115. The capture component 205 can store the recording of the conversation in a local storage apparatus, remote or cloud solution, and/or the like. In some embodiments, the capture component 205 can be integrated into the intelligence device 120. In other embodiments the capture component 205 is a remote recording apparatus that can be physically or wirelessly connected to the intelligence device 120. For example, the capture component 205 can be a microphone integrated into a ring worn by the user that is wirelessly connected to the user's mobile phone via Bluetooth or WiFi connections.

The capture component 205 can capture data in multiple modes. For example, data can be captured using wearable, mobile device, microphone, and/or the like. In some embodiments, voice recognition can be used by the capture component 205 to isolate different people during a conversation. In some embodiments, data can be captured via a smart phone, using an app and a device that will communicate to the phone from a device via Bluetooth technology. In some embodiments, data can be captured via a telephone integrated into an organization's already existing phone system.

The intelligence device 120 includes a verbal analysis component 210. The verbal analytics component 210 receives the recording of the conversation 110 for analysis. The verbal analytics component 210 analyzes the conversation 110 to determine or calculate a verbal intelligence (VI) index. The conversation 110 is analyzed to according VI factors such as Energy-Words-Tone-Rate of words spoken. Pitch measures the pitch of the user's 105 voice. Energy measures the volume of the user's 105 voice. Words measures the number of words spoken, e.g. in whole conversation 110, in sentences, between third party responses, and/or the like. Tone can measure the user's general character or attitude towards the words spoken. Rate measures the speed the words spoken, e.g. in sentences, whole conversation, start of conversation versus end of conversation, answers to questions, initial presentation, and/or the like.

In some embodiments, rate consistency and/or volume consistency can be captured (e.g. speeding up vs. slowing down, increasing vs. decreasing volume). In other embodiments, written, typed, or text communications can be captured and analyzed individually and/or in conjunction with spoken conversations. In other embodiments, braille, sign language, and/or the like can be analyzed. The verbal analysis component 210 can analyze and rate or score some or each VI data factor. The verbal analysis component 210 can generate an overall VI index of the user by combining, aggregating, averaging, weighted average, mean, or each individual scoring of the data factors.

In some embodiments, the verbal analysis component 210 can determine but not limited to: Number of Words spoken within a specified time frame or conversation, Most common words used, Unique words used by the speaker, Verbal Intelligence Index, and/or the like.

In some embodiments, the verbal analysis component 210 can construct and utilize a predictive model to determine the VI index. The predictive model can be based on determined correlation data to correlate data factors in previous conversations to feedback received about the previous conversations. The previous conversations can be of the user, the third party, both, neither, and/or the like. The predictive model can be built using the correlations such that current and future conversations need not utilize feedback for determining the VI index or other analytics.

The verbal analysis component 210 can acquire the feedback of the previous conversations by sending a survey or questionnaire to the third party 115 and/or the user 105. The survey can include qualifying questions about the conversation such as how the conversation was presented, positive/negative sentiment, and/or the like. The verbal analysis component 210 can receive the feedback as answers to the survey of the previous conversation. The survey can be sent to a third party's device.

The verbal analysis component 210 builds the prediction model by determining correlations between the feedback and the data factors. The verbal analysis component 210 determines the correlation data based on the determined correlations. In some embodiments, the verbal analysis component 210 determines the correlation data by applying a machine learning structure to the feedback and the data factors to construct the correlation data into the prediction model. The prediction model can receive the conversation 110 and use the prediction model on the conversation 110 to determine the VI index.

The intelligence device 120 includes an interface component 215. The interface component 215 can receive the analysis output from the verbal analysis component 210. The interface component 215 can generate intelligent dashboards for the user based on the analysis output. In some embodiments, the dashboards can be interactive or static. In other embodiments, the dashboards are customized and/or personalized for the user. The dashboards display the analysis output to the user, recommendations for improvement/increase effectiveness, playback of the recording of the conversation 110, interactive or annotated playback of the recording of the conversation 110, a transcript of the conversation 110, and/or the like. The user 105 can review the dashboards on a display of the intelligence device 120, a separate computing device, and/or the like. In some embodiments, the dashboards can be emailed, texted, push notification, and/or the like to the user 105.

In some embodiments, the interface component 215 can provide recommendations for conversation improvement within the dashboard. The recommendations may be provided in generated dashboards in the app, as an email, presentation, and/or the like. In some embodiments, the recommendations may be made in real time in a view on a display on the user's mobile device while a conversation is occurring. In other embodiments, the recommendations may be made after conversation.

In an example embodiment, the VI index can be calculated using the below algorithm. It is appreciated that other algorithms may be used to calculate the VI index. In some embodiments, the algorithm used to calculate a user's VI Index is outlined below using a basic algebraic formula. The algorithm consists of three variables used to measure one's relative VI. $x$=the total number of words the user speaks during a conversation. $y$=total number of trust inducing phrases used during a conversation by the user of the software. $z$=the score of one's tone during a conversation. The score can range between 0-4, using the tone parameters defined below.

VI Index=$100y/x+(z*100y/x)$. The VI index may be a weighted average program. An example calculation can be:
Trust Phrases—25%×4=1
Volume—25%×2=0.5
Pitch—25%×3=0.75
Rate of words 25%×4=1
SUM -------
Total Score 3.25

The variable of having the weighted average for each category can be determined by the testing of 100 processing samples. The weighting can be determined in multiple embodiments. In some embodiments, each user decides on their own what the weighted average should be for each of the four categories. In other embodiments, an initial weighting can use the 25% weight for each category and after a predetermined amount of trial samples the weighted average can be determined by the aggregate test results of the trial samples. For example, an average of 100 trial samples can be used for the point system, which rationalizes the weighted average for Trust Phrases is 30.77%, Volume is 15.38%, Pitch is 23.08% and Rate of Words is 30.77%. The determined weights can be built into the software and the user does not have to make any subjective weighting decisions. In some embodiments, each user can select their weighted average and then compare to the actual results of all trial samples to learn how close or far apart the users are from the mean and the average of trial samples. Using the above formula, a user's VI index can be between 1-10. In some embodiments, it is possible for a VI index to be greater than 10. In some embodiments, rewards or views can be generated according to the VI index. For example, a user can earn a gold star when accomplishing a VI index greater than 8 or 10.

In some embodiments, tone measurement can be measured in multiple embodiments. To calculate the VI index, the intelligence device 120 can measure four features of a user or speaker's tone. Each feature can receive a score of 1.33 or zero, and the scores of each feature can be added to get a total tone score of 0-4. A score of one can be assigned to each feature if the speaker's conversation falls within the normal range of human speech. A score of 0 can be assigned if one's conversation does not fall within the normal range. For example, each of the features, and their ranges can be:
Rate of Speech
  Less than 100 WPM=0
  100-165 WPM=1.33
  More than 165 WPM=0
Energy (e.g. Volume)
  Average Decibels less than 50=0
  50-65 Average Decibels=1.33
  Average Decibels greater than 65=0
Pitch (e.g. Inflection)
  Manic=0
  Normal=1.34
  Monotone=0

Trust Inducing and Negative Impact Phrases—For most valuable phrases (MVP), the intelligence device 120 can use "trust inducing" and "negative impact" phrases to measure a speaker's VI index. There are multiple trust inducing phrases that can be counted and/or otherwise measured. Examples of trust inducing phrases can be, but not limited to: You and I (me), I (we) understand, I (we) care, I (we) trust your judgement, What are your thoughts, I'd (we'd) like to share, What do you think, I (we) respect, Great idea, I'm (we're) available, Let's work together, How do you feel about, As your partner, Together, we can, I (we) sincerely believe, and/or the like. Examples of negative impact phrases can be, but not limited to: You can't, Bad idea, Wrong, No chance, and/or the like.

The intelligence device 120 can be implemented for many markets and/or use cases. For example, any user who uses a phone in a business environment or whose success is determined by developing a relationship with the caller is affected. Some other use cases or applications can include:
Use Case 1: Specialized services and luxury items
Use Case 2: Services—Customer Service Representatives (CSR)
Use Case 3: Medical—Problem: Poor customer service that is difficult to quantify
Use Case 4: Financial—Problem: User often uninformed about services provided; Solution: Increase trust level; Results can be measured
Use Case 5: IT—Problem: User generally unfamiliar with software; Solution: Sell more products and solutions; Results can be measured
Use Case 6: Recruiting/Staffing—Problem: A lot of falsifying and misleading information traded between the recruiter and recruit; Solution: Ability to screen recruits for "non-skill related" competencies. Ability of recruiter to establish a level of trust with potential recruit; Results can be measured Use Case 7: Fundraising—Problem: Lack of planning, poor support materials, not recruiting enough help; Solution: Ability of fundraiser to better sell the "mission" of the organization; Results can be measured Use Case 8: Collection service—Problem: Aggressive dialing, Poor services, Trust; Solution: Ability of the collector to establish a win-win situation with the debtor; Results can be measured Use Case 9: Ride Sharing Applications—Problem: Perceived and real security issues; Solution: Increased customer service through monitoring and coaching;

Use Case 10: Coaching—Problem: Unintended meanings of verbal communications; Solution: Create metrics to improve communication;

Use Case 11: Customer Service—Problem: Unskilled personnel, Lack of empathy and too much automation; Solution: Create a "safe" atmosphere where caller can openly discuss an issue(s); Results can be measured Use Case 12: Teaching, tutoring, lessons Use Case 13: Luxury (high end) Items Sales (e.g. Yachts, Planes, Automobiles and Real Estate)—Problem: Lack of trust with salesperson; Solution: Increased trust and communication skills through analysis and training; Results can be measured Use Case 14: Existing telephone A.I. solutions—Problem: Lack of VI analytics in the software; Solution: Ability of SaaS provider to include upgrade for additional analytics; Results can be measured.

In some embodiments, the intelligence device 120 determines correlation using captured inflections in text (Sentiment) and intonations in voice (Pitch) to identify common patterns within them to correlate tone and text in conversations. The patterns are used to create the predictive model. Rising and falling intonations and circumflex pitch patterns can be associated with certain words or phrases. The patterns can be correlated with qualified call data to produce results that can then be used to predict possible future call outcomes based upon the call data captured in real-time. The analysis can assist callers with improving the overall outcome of the call.

FIGS. 3-8 depict illustrations for describing an example embodiment to correlate a conversation and sentiment. It is appreciated that other embodiments are contemplated.

In an example embodiment, a conversation can be organized into a message structure to organize call data for analysis. In some embodiments, the message structure is formatted in XML, JSON, another format, and/or the like. FIG. 3 illustrates an example call message structure. The call message structure can be divided into three parts: a call tag, a caller tag, and a recipient tag.

FIG. 4 depicts a call tag structure as part of the call message structure. The call tag structure includes:
- CallID—a unique identifier used to define the call. This field will be used to uniquely access the call from within a database, such as a SQL database.
- CallType—used to identify the type of call conducted—sales, collections, financial, insurance, etc.
- CallPurpose—used to define the purpose of the call—initial call, follow-up, quote, etc.
- CallComments—used to capture comments made by the caller regarding the call.
- CallStartTime—the time the call began in universal time code (UTC) format.
- CallEndTime—The time the call ended in UTC format.
- Caller—This is the child element that contains all information pertaining to the caller.
- Recipient—This is the child element that contains all information pertaining to the recipient of the call.

FIG. 5 depicts a caller tag structure part of the call message structure. The caller tag structure includes:
- CallerID—A unique identifier used to define the caller. This field will be used to uniquely identify the caller within the SQL Database.
- CallText—This is a Binary large object (BLOB) object containing the entire contents of the caller's text during the call. This text is created by sending the call audio to a speech to text converter. This text may be further encrypted to prevent unauthorized access of the call text due to legal purposes.
- CallAudio—This is a BLOB object containing the entire contents of the caller's audio during the call. In some embodiments, the audio can be created by the 3rd party communication platform. This audio may be further encrypted to prevent unauthorized access of the call audio due to legal purposes.
- PitchTrack—This is a BLOB object containing the entire contents of the caller's pitch track during the call. In some embodiments, the pitch track can be created by an Audio Processing service of the intelligence device 120 using an autocorrelation algorithm. The pitch track may be further encrypted to prevent unauthorized access of the call audio.
- SpeechRate—This is the speech rate (in words per minute) the caller used during the duration of the call. The speech rate is created by the Audio Processing service using a combination of data received by the Communications platform and the Speech to Text converter.
- Loudness—This is the loudness (RMS volume in decibels) of the caller's voice during the duration of the call. The loudness is created by the Audio Processing service using data received by the Communications platform.
- Sentences—The Sentences Tag contains a collection of Sentence structures, which are used to provide tone/text correlation information for data analysis.
- Sentence—The Sentence Tag contains a collection of artifacts based upon a spoken Sentence made by the Caller.
- SentenceID—a unique identifier used to define the sentence. This field will be used to uniquely access the sentence from within the SQL Database.
- SentenceText—This is the actual text of the sentence that was spoken by the caller. This data may be encrypted to prevent unauthorized access of the text due to legal purposes.
- Sentiment—The Sentiment is the value calculated by the Sentiment Analysis engine based upon the text in the sentence created by the caller.
- TrustArtifacts—Trust Artifacts are words or phrases that are deemed valuable to the quality and success of the conversation. These artifacts are captured so they can be qualified against the call.
- TrustArtifact—The trust artifact used by the Caller during the conversation.
- SpeechSegments—Every Sentence is made up of one or more speech segments. Speech segments are used to correlate pitch patterns within the speech segments to the sentiment of the sentence spoken.
- SpeechSegment—A speech segment contains both text and audio information used for data analysis.
- SegmentID—a unique identifier used to define the segment. This field will be used to uniquely access the segment from within the SQL Database.

SegmentText—This is the actual text that was spoken by the caller during the speech segment. There may be zero or more words within the segment text.

PitchSegment—This is the actual pitch track segment associated with the identification and classification of the Pitch Type.

PitchType—The pitch type is calculated by the Audio Processing service of the intelligence device 120 by analyzing the Pitch Track against the caller's fundamental frequency. A standard deviation curve is plotted with the caller's fundamental frequency used as the mean value. Deviations from the mean are segmented into categories defined by the administrator of the system. For example, a mean value would have a Pitch Type of "Normal". Depending upon the scale, the administrator can create various levels of Pitch Types to correspond with the desired definition of the results displayed.

Qualification—The Qualification structure is used to define all of the qualifying information that will be used to correlate against the data collected on the caller.

CallRating—This is used to provide a very simple call rating from the Caller when questionnaires are not implemented.

Questionnaires—One or more Questionnaires can be associated with a call depending upon the business needs.

Questionnaire—This is a questionnaire completed by the caller.

QuestionnaireID—A unique identifier used to define the questionnaire. This field will be used to uniquely identify the questionnaire within the SQL Database.

QuestionnaireRating—This is rating generated based upon the values collected in the questions.

Questions—There can be one or more questions associated with a questionnaire.

Question—This structure contains the key/value pairs associated with a question.

QuestionID—A unique identifier used to define the question. This field will be used to uniquely identify the question within the SQL Database.

QuestionKey—This field contains the actual text of the question—i.e.) How would you rate the Recipients response to the questions?

QuestionValue—This field contains the actual answer to the question—i.e.) 5 or Excellent Demographics—This structure contains demographic information regarding the caller.

PlaceOfResidence—The caller's place of residence.

Age—The caller's age.

Sex—The caller's sex.

Ethnicity—The caller's ethnicity.

Income—The caller's income.

Education—The caller's education.

FIG. 6 depicts a recipient (i.e. third party) tag structure part of the call message structure. The recipient structure includes:

RecipientID—A unique identifier used to define the recipient. This field will be used to uniquely identify the recipient within the SQL Database.

CallText—This is a BLOB object containing the entire contents of the recipient's text during the call. This text is created by sending the call audio to a speech to text converter. This text may be further encrypted to prevent unauthorized access of the call text.

CallAudio—This is a BLOB object containing the entire contents of the recipient's audio during the call. In some embodiments, the audio is created by the 3rd party communication platform. This audio may be further encrypted to prevent unauthorized access of the call audio due to legal purposes.

PitchTrack—This is a BLOB object containing the entire contents of the recipient's pitch track during the call. This pitch track is created by the Audio Processing service of the intelligence device 120 using the auto-correlation algorithm. This pitch track may be further encrypted to prevent unauthorized access of the call audio due to legal purposes.

SpeechRate—This is the speech rate (in words per minute) the recipient used during the duration of the call. The speech rate is created by the Audio Processing service using a combination of data received by the Communications platform and the Speech to Text converter.

Loudness—This is the loudness (RMS volume in decibels) of the recipient's voice during the duration of the call. The loudness is created by the Audio Processing service using data received by the Communications platform.

Sentences—The Sentences Tag contains a collection of Sentence structures, which are used to provide tone/text correlation information for data analysis.

Sentence—The Sentence Tag contains a collection of artifacts based upon a spoken Sentence made by the Recipient.

SentenceID—a unique identifier used to define the sentence. This field will be used to uniquely access the sentence from within the SQL Database.

SentenceText—This is the actual text of the sentence that was spoken by the recipient. This data may be encrypted to prevent unauthorized access of the text due to legal purposes.

Sentiment—The Sentiment is the value calculated by the Sentiment Analysis engine based upon the text in the sentence created by the recipient.

SpeechSegments—Every Sentence is made up of one or more speech segments. Speech segments are used to correlate pitch patterns within the speech segments to the sentiment of the sentence spoken.

SpeechSegment—A speech segment contains both text and audio information used for data analysis.

SegmentID—a unique identifier used to define the segment. This field will be used to uniquely access the segment from within the SQL Database.

SegmentText—This is the actual text that was spoken by the recipient during the speech segment. There may be zero or more words within the segment text.

PitchSegment—This is the actual pitch track segment associated with the identification and classification of the Pitch Type.

PitchType—The pitch type is calculated by the intelligence device 120 by analyzing the Pitch Track against the recipient's fundamental frequency. A standard deviation curve is plotted with the recipient's fundamental frequency used as the mean value. Deviations from the mean are segmented into categories defined by the administrator of the system. For example, a mean value would have a Pitch Type of "Normal". Depending upon the scale, the administrator can create various levels of Pitch Types to correspond with the desired definition of the results displayed.

Qualification—The Qualification structure is used to define all of the qualifying information that will be used to correlate against the data collected on the recipient.

CallRating—This is used to provide a very simple call rating from the Recipient when questionnaires are not implemented.

Questionnaires—One or more Questionnaires can be associated with a call depending upon the business needs.

Questionnaire—This is a questionnaire completed by the recipient.

QuestionnaireID—A unique identifier used to define the questionnaire. This field will be used to uniquely identify the questionnaire within the SQL Database.

QuestionnaireRating—This is rating generated based upon the values collected in the questions.

Questions—There can be one or more questions associated with a questionnaire.

Question—This structure contains the key/value pairs associated with a question.

QuestionID—A unique identifier used to define the question. This field will be used to uniquely identify the question within the SQL Database.

QuestionKey—This field contains the actual text of the question—i.e.) How would you rate the Recipients response to the questions?

QuestionValue—This field contains the actual answer to the question—i.e.) 5 or Excellent Demographics—This structure contains demographic information regarding the recipient.

PlaceOfResidence—The recipient's place of residence.

Age—The recipient's age.

Sex—The recipient's sex.

Ethnicity—The recipient's ethnicity.

Income—The recipient's income.

Education—The recipient's education.

In an example embodiment, the audio from the conversation 110 is processed for correlation and/or generating a VI index. The audio processing is used to determine call data for analysis. The call data can include at least one of: The Caller's audio stream, The Recipient's audio stream, The Caller's audio stream converted to text, The Recipient's audio stream converted to text, The Caller's Pitch Track, The Recipient's Pitch Track, The Caller's Speech Rate in words per minute, The Recipient's Speech Rate in words per minute, The Caller's Loudness (RMS) in decibels, The Recipient's Loudness (RMS) in decibels, The Caller's Sentiment, The Recipient's Sentiment, The Caller's Trust Artifacts, and/or the like.

In an example embodiment, the conversation audio is an audio stream over a telephone. In some embodiments, the audio stream is provided by a Communications Platform that is capable of making and receiving phone calls, text messages, and other communication functions via an API layer with the intelligence device 120. The intelligence device 120 can receive a stream of audio from the Communication Platform. The audio for the Caller and Recipient is buffered across two distinct audio channels and is stored as in respective locations within the call message, i.e. Caller/CallAudio and Recipient/CallAudio.

In the example embodiment, the intelligence device 120 can perform speech to text processing of the conversation 110. The Speech to Text processing facilitates sentiment analysis, identify trust data, and pitch emphasis on sentence structures deemed successful or unsuccessful. In some embodiments, the Speech to Text processing is performed by a Speech to Text provider. The intelligence device 120 can submit the audio stream received by the Communications Platform to the Speech to Text provider, which in turn, will provide a text version of the conversation 110. The text can include punctuation such as periods and question marks based upon the pitch analysis and silence sampling of the conversation 110. The text can be store in respective locations within the call message, i.e. Caller/CallText and Recipient/CallText. For each sentence created by the Speech to Text processor, the sentence will be stored in the <SentenceText> element of the respective Caller or Recipient <Sentence> segment. Each sentence will be given a unique sentence identifier, which is stored in the <SentenceID> element. The identifier can be used to provide the ordering and processing of the Sentences.

Figure 7:
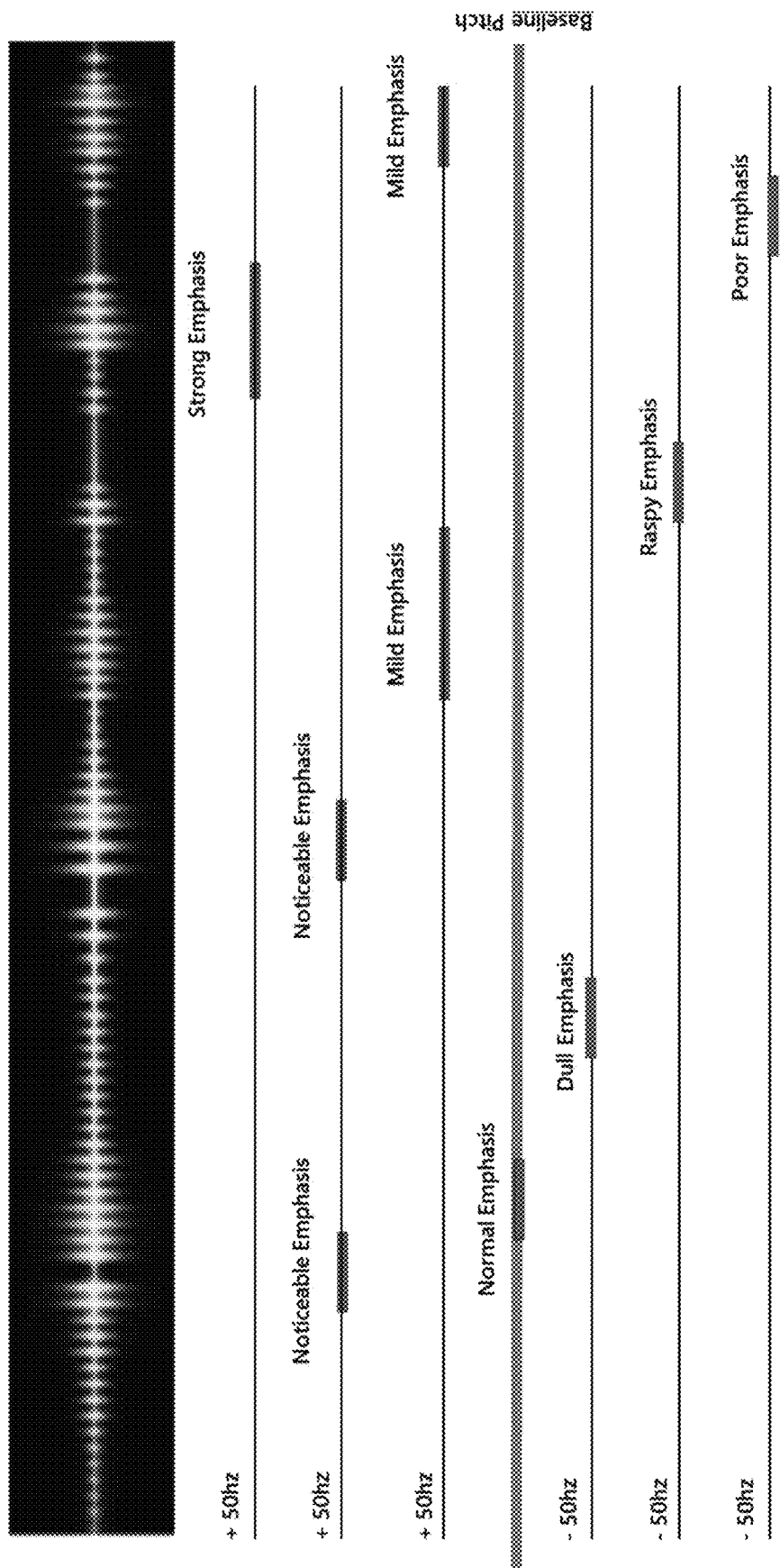
FIG. 7 illustrates a pitch track view and analysis of deviations from a baseline pitch to determine sentiment.

In the example embodiment, the intelligence device 120 includes Pitch Track processing that identifies pitch changes in voices when speaking. FIG. 7 illustrates a Pitch Track view and analysis of deviations from a baseline pitch to determine sentiment. The Pitch Track for the respective Caller and Recipient is stored as respective locations within the CALL message, i.e. Caller/PitchTrack and Recipient/PitchTrack. The Baseline Pitch is the mean pitch frequency seen throughout the conversation. It represents the fundamental frequency (f0) of the caller or recipient. Any deviations from this baseline value can be identified by scaling the deviations from the mean and assigning definitions to the scaled values as in the example above. In some embodiments, custom definable definitions can be set. These labels on the scale are then reported in the Call Message <PitchType> element within the <SpeechSegment> section.

In the example embodiment, the intelligence device 120 determine speech rate of the conversation 110. The Speech rate is determined by identifying the number of words spoken within a specific period of time (e.g. words per minute). The Speech Rate for the respective Caller and Recipient is stored in respective locations within the call message, i.e. Caller/SpeechRate and Recipient/SpeechRate.

In the example embodiment, the intelligence device 120 determines loudness of the conversation. The loudness is determined by identifying voice amplification (RMS in decibels) over the period of the call for the Caller and the Recipient. The Loudness for the respective Caller and Recipient is stored in respective locations within the CALL message, i.e. Caller/Loudness and Recipient/Loudness.

In the example embodiment, the intelligence device 120 can determine sentence structure of sentences in the conversation 110. The Sentence structure can provide correlation between text, tone, and qualified attributes.

The intelligence device 120 can perform Sentiment Analysis on whole sentences. The sentences contain individual words or phrases that contain pitch and trust artifacts. Correlation of sentences to successful conversations are identified by the intelligence device 120 and distinguish between successful and unsuccessful sentences to find correlations between sentences and speech segment artifacts within the sentences. A sentence includes one or more speech segments. Each speech segment can be identified by a brief pause between words. A speech segment may contain one or more words. Each speech segment will include a portion of the pitch track described above.

Figure 8:
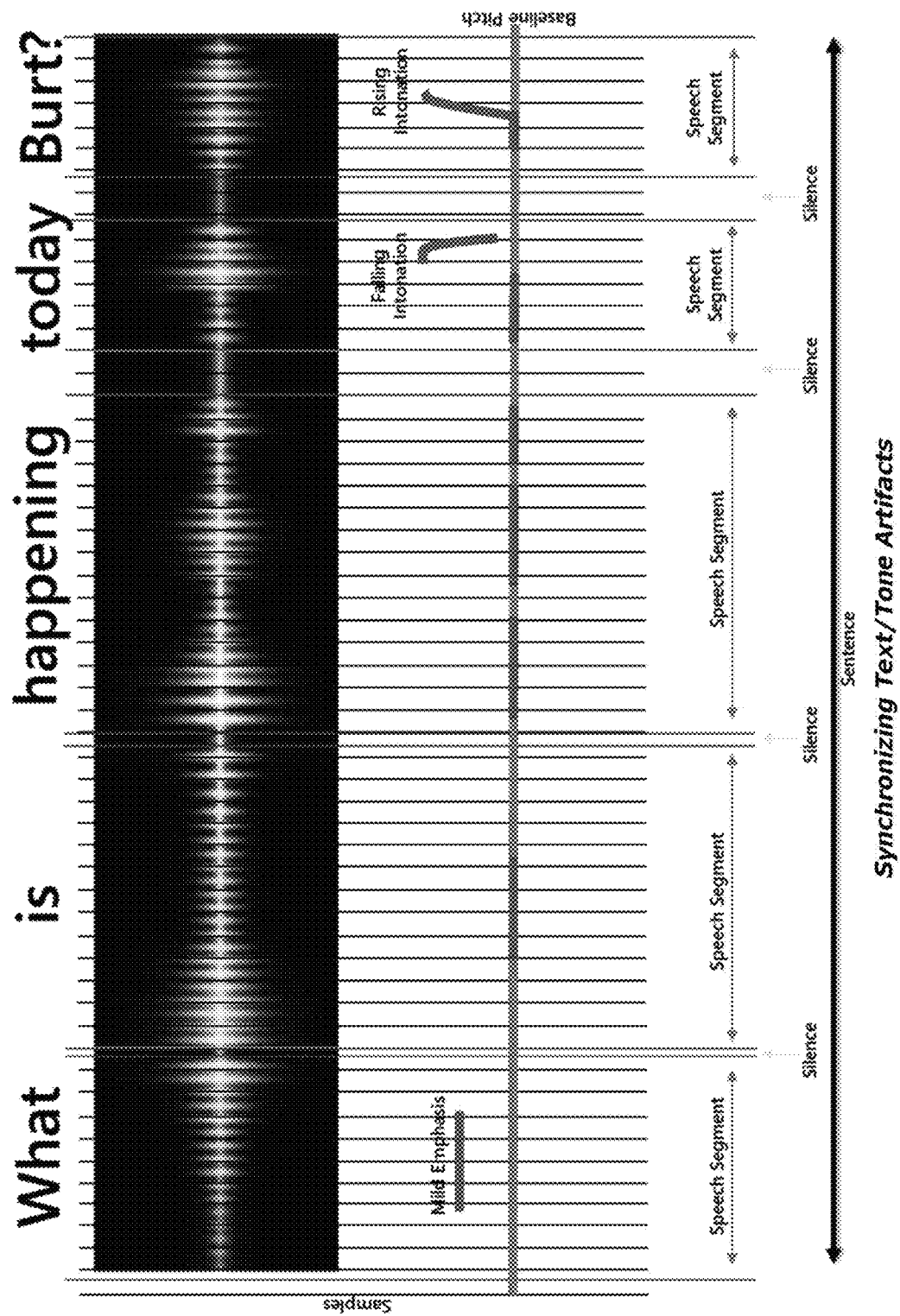
FIG. 8 illustrates a synchronization of the pitch track and the speech segment.

FIG. 8 depicts a synchronization of the pitch track and the text to speech segment. The intelligence device 120 synchronizes the conversation 110 and the pitch track and the text. The synchronization provides the ability to identify speech segments within sentences. From the analysis, the intelligence device 120 can identify the specific text spoken within a speech segment and the pitch track segment identified within the speech segment. As mentioned earlier, the intelligence device 120 analyzes the Pitch Track against the recipient's fundamental frequency. A standard deviation curve can plotted with the recipient's fundamental frequency used as the mean value. The intelligence device 120 segments deviations from the mean into defined categories. For example, a mean value could have a Pitch Type of "Normal". Depending upon the scale, the intelligence device 120 can determine different levels of Pitch Types to correspond with a definition of the results displayed. The mean or deviations for a given speech segment are determined by the intelligence device 120 and applied to the speech segment structure in the CALL message.

The SegmentText for the respective Caller and Recipient is stored in respective locations within the CALL message, i.e. Caller/Sentences/Sentence/SpeechSegments/SpeechSegment/SegmentText and Recipient/Sentences/Sentence/SpeechSegments/SpeechSegment/SegmentText.

The PitchSegment for the respective Caller and Recipient is stored in respective locations within the CALL message, i.e. Caller/Sentences/Sentence/SpeechSegments/SpeechSegment/PitchSegment and Recipient/Sentences/Sentence/SpeechSegments/SpeechSegment/PitchSegment.

The PitchType for the respective Caller and Recipient is stored in respective locations within the CALL message, i.e. Caller/Sentences/Sentence/SpeechSegments/SpeechSegment/PitchType and Recipient/Sentences/Sentence/SpeechSegments/SpeechSegment/PitchType.

The intelligence device 120 performs sentiment analysis. Sentiment Analysis is the process of mining text for clues about positive or negative sentiment. Sentiment labels (such as "negative", "neutral" and "positive") are defined based on the highest confidence score found by the analysis at a sentence and document-level. The intelligence device 120 returns confidence scores between 0 and 1 for each conversation & sentences within it for positive, neutral and negative sentiment. The intelligence device 120 conducts opinion mining. The opinion mining can be Aspect-based Sentiment Analysis in Natural Language Processing (NLP). The intelligence device 120 provides granular information about the opinions related to aspects (such as the attributes of products or services) in text of the conversation. The intelligence device 120 facilitates processing of Sentiment Analysis. The intelligence device 120 receives either the Call Message or a reference to the Call Message to access the Call Text for the Caller and Recipient from the Call message. The intelligence device 120 analyzes the Caller and Recipient sentence structures. Each sentence that is processed by the intelligence device 120 and analyzed and its corresponding sentiment value is stored in the <Sentiment> element of the <Sentence> being processed. For example, the Caller has 5 sentence structures located in the <Sentences> node. Each sentence's <SentenceText> data is sent to the intelligence device 120 using the <SentenceID> as the order in which they are processed. When the intelligence device 120 returns the sentiment value for a given sentence, the sentiment value is stored in the Sentence's <Sentiment> tag.

Figure 9:
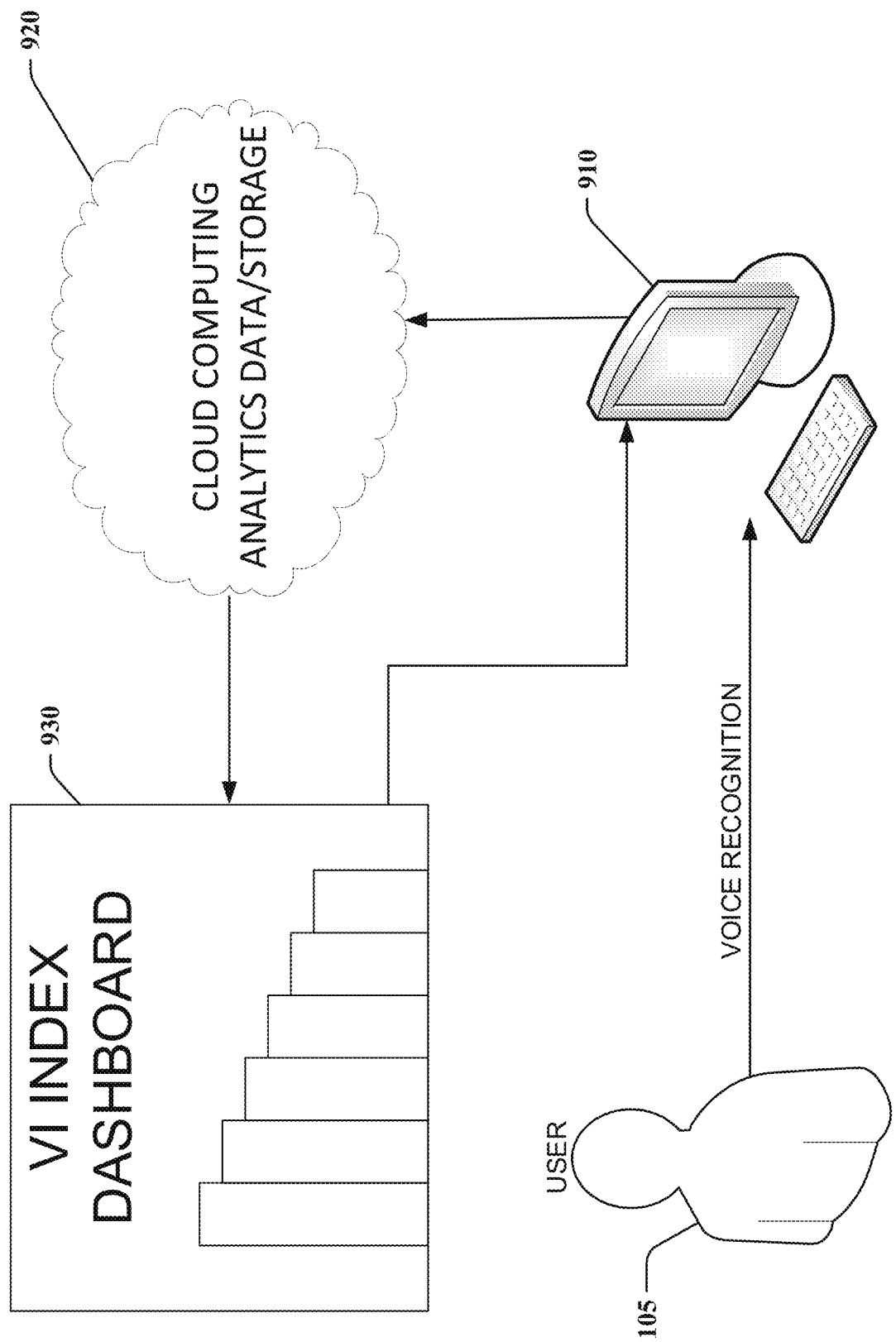
FIG. 9 illustrates an exemplary embodiment of a live view or real time dashboard generated on a computer screen.

FIG. 9 depicts an exemplary embodiment of a live view or real time dashboard generated on a computer screen in a cloud solution for a user speaking with a customer. In some embodiments, the user 105 can use a headset capture device attached to a computer terminal device 910. The capture device and/or the computer terminal device 910 can capture the user's voice and recognize the conversation. The conversation can be provided to a cloud solution 920 for analysis to determine a live VI index dashboard 930. The live VI index dashboard 930 can be provided from the cloud solution 920 to the computer terminal device 910 and displayed to the user 105.

Figure 10:
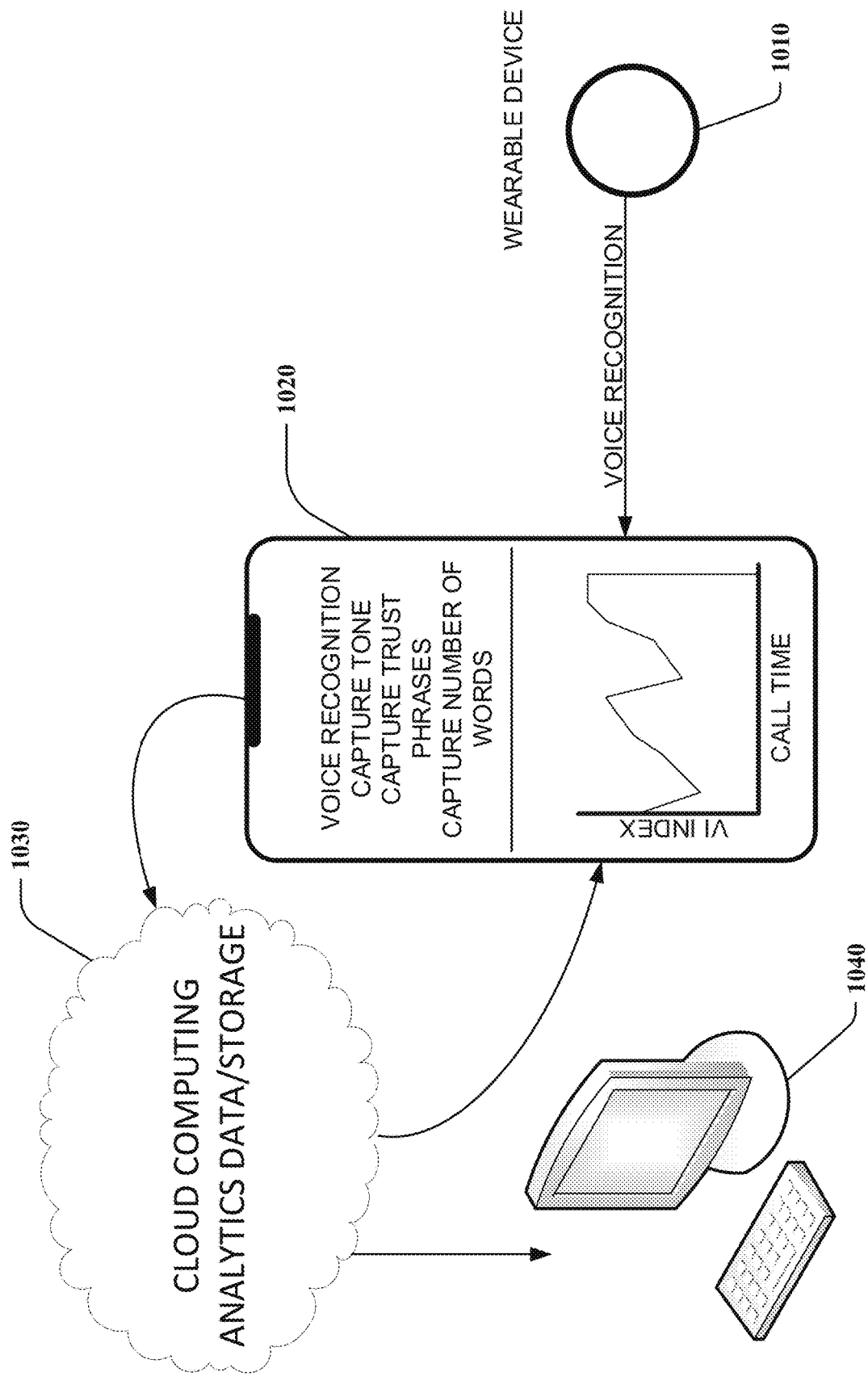
FIG. 10 illustrates an exemplary embodiment of a wearable device as a capture component that is wirelessly connected to a user's mobile phone.

FIG. 10 depicts an exemplary embodiment of a wearable device 1010 as a capture component that is wirelessly (e.g. Bluetooth) connected to a user's mobile phone 1020. The mobile phone 1020 can utilize a cloud solution 1030 for analysis and generating a dashboard view(s) 1030. The dashboard views 1030 and analysis can be pushed to the mobile phone 1020 and/or a user's personal computing device 1040 for displaying to the user.

Figure 11:
FIG. 11 illustrates an exemplary embodiment of a VI index meter view.

FIG. 11 depicts an exemplary embodiment of a VI index meter view. The view can be displayed on the intelligence device 120 to the user 105 after the call or in real or near real time during the call.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull control model. The components may also interact with one or more other components not specifically described herein for sake of brevity, but known by those of skill in the art.

Furthermore, various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Among other things, such components can automate certain mechanisms or processes performed thereby to make portions of the systems and methods more adaptive as well as efficient and intelligent. By way of example, and not limitation, such mechanisms can be utilized by the intelligence device 120 for verbal analytics.

Figure 12:
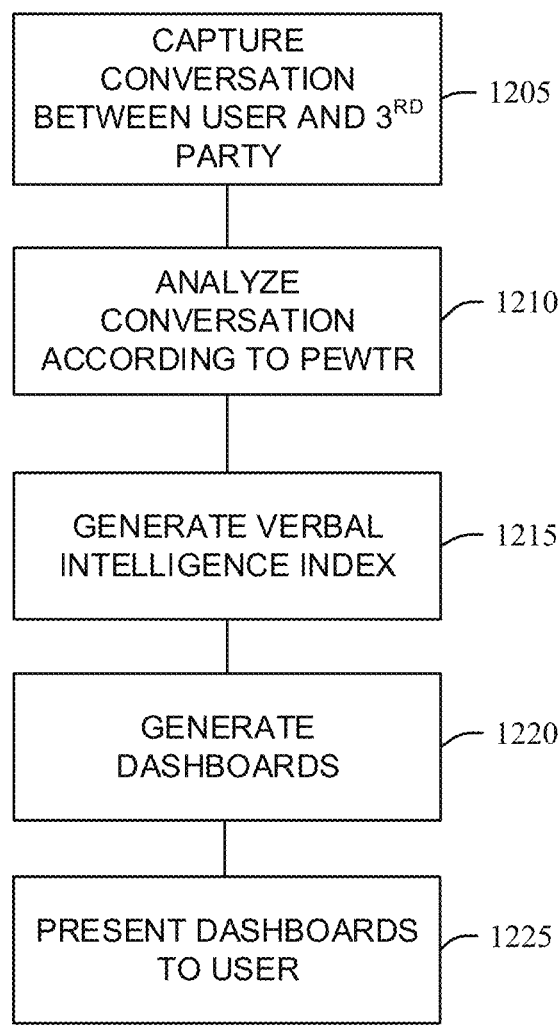
FIG. 12 illustrates a method for verbal language analysis.

In view of the exemplary systems described above, methods that may be implemented in accordance with the disclosed subject matter will be better appreciated with reference to flow chart diagram of FIG. 12. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

FIG. 12 illustrates a method 1200 for verbal language analysis. At 1205, a conversation between a user and a third party is captured. For example, an intelligence device includes a microphone that records the conversation. At 1210, the conversation is analyzed according to verbal language analysis for the user. The conversation is analyzed for individual conversation data factors. At 1215, a verbal intelligence index is calculated from the analysis of the conversation factors. The verbal intelligence index is a score metric based on at least one of energy, words, inflection, tone (e.g. pitch and sentiment), or rate. In some embodiments, the verbal intelligence index can be normalized to a score out of 100. At 1220, a dashboard that provides analytics to the user for review is generated. The dashboard conveys analytics, verbal intelligence index, recommendations for improvement, and/or the like. The dashboard can be interactive and provide playback of the conversation or highlights of parts of the conversation that could have been improved. At 1225, the dashboard is provided to the user. The dashboard can be provided to the user on the intelligence device via an interface. The dashboard may also be provided to the user via a notification, email, text, alert, and/or the like and viewed on any device by the user.

A method, comprising: capturing a conversation between a user and a third party; analyzing the conversation according to verbal language analysis for the user; and generating a dashboard that provides analytics to the user for review.

A system, comprising: one or more processors; a memory storing one or more instructions that, when executed by the one or more processors, cause the one or more processors to perform a method comprising: capture a conversation between a user and a third party; analyze the conversation according to verbal language analysis for the user; and generate a dashboard that provides analytics to the user for review.

A computer readable medium having instructions to control one or more processors configured to: capture a conversation between a user and a third party; analyze the conversation according to verbal language analysis for the user; and generate a dashboard that provides analytics to the user for review.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 13:
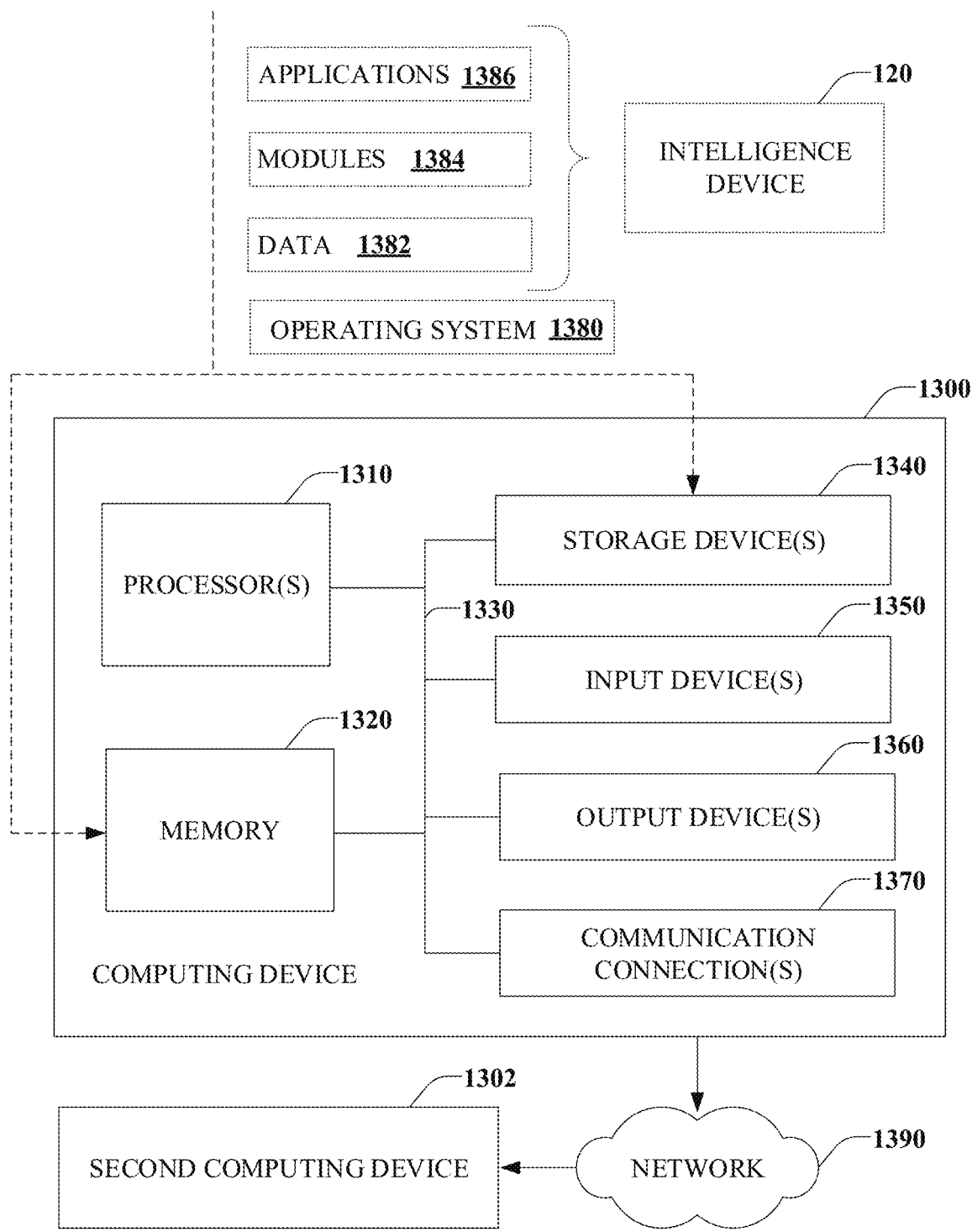
FIG. 13 illustrates a computing environment where one or more of the provisions set forth herein can be implemented, according to some embodiments.

To provide a context for the disclosed subject matter, FIG. 13 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor, multi-core processor, quantum processor, or multi-quantum parallel processor computer systems, mini-computing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 13, illustrated is an example computing device 1300 (e.g., desktop, laptop, tablet, watch, server, hand-held, programmable consumer or industrial electronics, set-top box, game system, compute node . . . ). The computing device 1300 includes one or more processor(s) 1310, memory 1320, system bus 1330, storage device(s) 1340, input device(s) 1350, output device(s) 1360, and communications connection(s) 1370. The system bus 1330 communicatively couples at least the above system constituents. However, the computing device 1300, in its simplest form, can include one or more processors 1310 coupled to memory 1320, wherein the one or more processors 1310 execute various computer executable actions, instructions, and or components stored in the memory 1320.

The processor(s) 1310 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1310 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1310 can be a graphics processor unit (GPU) that performs calculations with respect to digital image processing and computer graphics.

The computing device 1300 can include or otherwise interact with a variety of computer-readable media to facilitate control of the computing device to implement one or more aspects of the disclosed subject matter. The computer-readable media can be any available media that accessible to the computing device 1300 and includes volatile and non-volatile media, and removable and non-removable media.

Computer-readable media can comprise two distinct and mutually exclusive types, namely storage media and communication media.

Storage media includes volatile and nonvolatile, removable, and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computing device 1300. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 1320 and storage device(s) 1340 are examples of computer-readable storage media. Depending on the configuration and type of computing device, the memory 1320 may be volatile (e.g., random access memory (RAM)), non-volatile (e.g., read only memory (ROM), flash memory . . . ) or some combination of the two. By way of example, the basic input/output system (BIOS), including basic routines to transfer information between elements within the computing device 1300, such as during start-up, can be stored in nonvolatile memory, while volatile memory can act as external cache memory to facilitate processing by the processor(s) 1310, among other things.

The storage device(s) 1340 include removable/non-removable, volatile/non-volatile storage media for storage of vast amounts of data relative to the memory 1320. For example, storage device(s) 1340 include, but are not limited to, one or more devices such as a magnetic or optical disk drive, floppy disk drive, flash memory, solid-state drive, or memory stick.

Memory 1320 and storage device(s) 1340 can include, or have stored therein, operating system 1380, one or more applications 1386, one or more program modules 1384, and data 1382. The operating system 1380 acts to control and allocate resources of the computing device 1300. Applications 1386 include one or both of system and application software and can exploit management of resources by the operating system 1380 through program modules 1384 and data 1382 stored in the memory 1320 and/or storage device(s) 1340 to perform one or more actions. Accordingly, applications 1386 can turn a general-purpose computer 1300 into a specialized machine in accordance with the logic provided thereby.

All or portions of the disclosed subject matter can be implemented using standard programming and/or engineering techniques to produce software, firmware, hardware, or any combination thereof to control the computing device 1300 to realize the disclosed functionality. By way of example and not limitation, all or portions of the intelligence device 120 can be, or form part of, the application 1386, and include one or more modules 1384 and data 1382 stored in memory and/or storage device(s) 1340 whose functionality can be realized when executed by one or more processor(s) 1310.

In accordance with one particular embodiment, the processor(s) 1310 can correspond to a system on a chip (SOC) or like architecture including, or in other words integrating, both hardware and software on a single integrated circuit substrate. Here, the processor(s) 1310 can include one or more processors as well as memory at least similar to the processor(s) 1310 and memory 1320, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the intelligence device 120 and/or functionality associated therewith can be embedded within hardware in a SOC architecture.

The input device(s) 1350 and output device(s) 1360 can be communicatively coupled to the computing device 1300. By way of example, the input device(s) 1350 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 1360, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 1350 and output device(s) 1360 can be connected to the computing device 1300 by way of wired connection (e.g., bus), wireless connection (e.g., Wi-Fi, Bluetooth . . . ), or a combination thereof.

The computing device 1300 can also include communication connection(s) 1370 to enable communication with at least a second computing device 1302 by means of a network 1390. The communication connection(s) 1370 can include wired or wireless communication mechanisms to support network communication. The network 1390 can correspond to a local area network (LAN) or a wide area network (WAN) such as the Internet. The second computing device 1302 can be another processor-based device with which the computing device 1300 can interact. For example, the computing device 1300 can correspond to a server that executes functionality of intelligence device 120, and the second computing device 1302 can be a user device that communications and interacts with the computing device 1300.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method, comprising:
capturing a conversation between a user and a third party;
analyzing the conversation according to verbal language analysis for the user, wherein the verbal language analysis includes:
determining a plurality of data factors associated with the conversation, the plurality of data factors including energy, pitch, rate of words, and a Trust Artifact, wherein the Trust Artifact comprises one or more trust phrases and non-word indicators that indicate a level of established trust,
calculating a weighted average of each of the plurality of data factors to calculate a verbal intelligence index, and
outputting the verbal intelligence index as a score metric, and
generating a dashboard that displays analytics to the user for review, wherein the analytics comprise the score metric of the verbal intelligence index.

2. The method of claim 1, comprising:
wherein the verbal intelligence index is based in part on correlation data, wherein the correlation data is based in party on feedback provided from previous conversations of the user.

3. The method of claim 2, comprising:
acquiring the feedback from the previous conversations, wherein the acquiring comprises:
receiving the feedback from the user and a recipient of the previous conversation;
determining correlations between the feedback and the data factors; and
constructing the correlation data based on the determined correlations.

4. The method of claim 3, comprising:
determining a prediction model based on the correlation data; and
determining the verbal intelligence index based on the prediction model.

5. The method of claim 4, wherein constructing the correlation data comprises:
applying a machine learning structure to the feedback and the data factors to construct the correlation data.

6. The method of claim 1, wherein determining the verbal intelligence index comprises:
determining demographic information of the third party; and
determining the verbal intelligence index based on the demographic information.

7. The method of claim 1, comprising:
wherein determining the verbal intelligence index is based on an autocorrelating algorithm, wherein the autocorrelating algorithm is tuned according to machine learned settings to capture intonations.

8. The method of claim 1, wherein each of the plurality of data factors has a different weighted average.

9. The method of claim 1, wherein the analytics further comprise at least one of a recommendation for improvement or increased effectiveness, a playback of the captured conversation, an interactive or annotated playback of the captured conversation, or a transcript of the captured conversation.

10. The method of claim 1, wherein the verbal intelligence index (VI Index) is calculated by the algorithm VI Index=100y/x+(z*100y/x), where:
x is a total number of words spoken by the user during the conversation,
y is the total number of Trust artifacts used during the conversation, and
z is a score of a tone of the user during the conversation.

11. A system, comprising:
one or more processors;
a memory storing one or more instructions that, when executed by the one or more processors, cause the one or more processors to perform a method comprising:
capture a conversation between a user and a third party;
analyze the conversation according to verbal language analysis for the user, wherein the verbal language analysis includes:
determining a plurality of data factors associated with the conversation, the plurality of data factors including energy, pitch, rate of words, and a Trust Artifact that comprises one or more trust phrases and non-word indicators that indicate a level of established trust
calculating a weighted average of each of the plurality of data factors to calculate a verbal intelligence index, and
outputting the verbal intelligence index as a score metric; and
generate a dashboard that displays analytics to the user for review, wherein the analytics comprise the score metric of the verbal intelligence index.

12. The system of claim 11, the method comprising:
wherein the verbal intelligence index is based in part on correlation data, wherein the correlation data is based in party on feedback provided from previous conversations of the user.

13. The system of claim 12, the method comprising:
acquiring the feedback from the previous conversations, wherein the acquiring comprises:
receiving the feedback from the user and a recipient of the previous conversation;
determining correlations between the feedback and the data factors; and
constructing the correlation data based on the determined correlations.

14. The system of claim 13, the method comprising:
determining a prediction model based on the correlation data; and
determining the verbal intelligence index based on the prediction model.

15. The system of claim 14, wherein constructing the correlation data comprises:
applying a machine learning structure to the feedback and the data factors to construct the correlation data.

16. The system of claim 11, wherein determining the verbal intelligence index comprises:
determining demographic information of the third party; and
determining the verbal intelligence index based on the demographic information.

17. The system of claim 11, the method comprising:
wherein determining the verbal intelligence index is based on an autocorrelating algorithm, wherein the autocorrelating algorithm is tuned according to machine learned settings to capture intonations.

18. The system of claim 11, wherein each of the plurality of data factors has a different weighted average.

19. A non-transitory computer readable medium having instructions to control one or more processors configured to:
- capture a conversation between a user and a third party;
- analyze the conversation according to verbal language analysis for the user, wherein the verbal language analysis includes:
  - determining a plurality of data factors associated with the conversation, the plurality of data factors including energy, pitch, or rate of words, and a Trust Artifact that comprises one or more trust phrases and non-word indicators that indicate a level of established trust,
  - calculating a weighted average of each of the plurality of data factors to calculate a verbal intelligence index, and
  - outputting the verbal intelligence index as a score metric; and
- generate a dashboard that displays analytics to the user for review, wherein the analytics comprise the score metric of the verbal intelligence index.

20. The computer readable medium of claim 19, wherein each of the plurality of data factors has a different weighted average.

* * * * *